Nov. 30, 1954 H. W. GILFILLAN ET AL 2,695,695
ELECTROMAGNETICALLY OPERATED CLUTCH OR BRAKE
Filed May 31, 1950 2 Sheets-Sheet 2
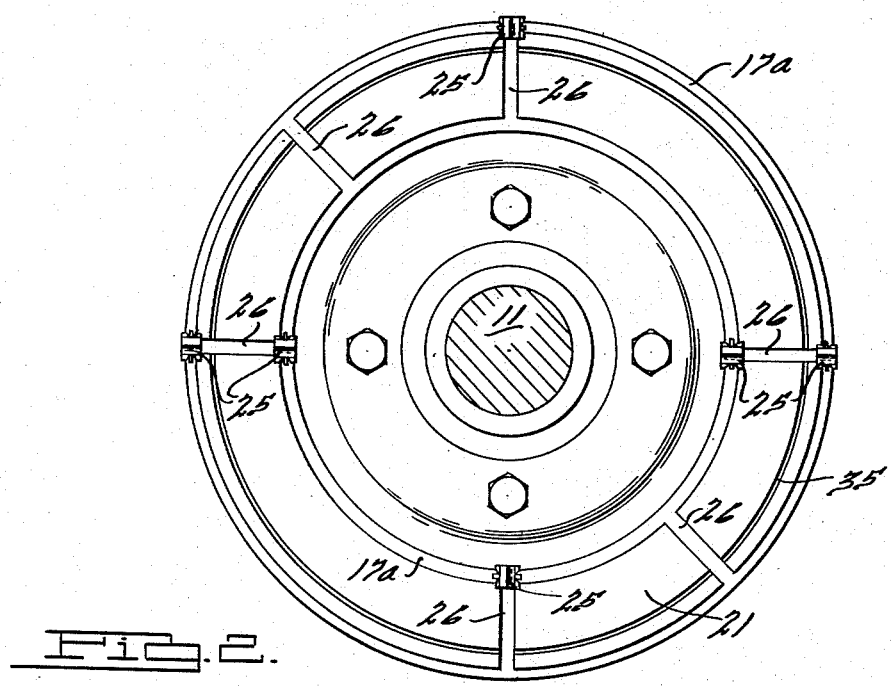
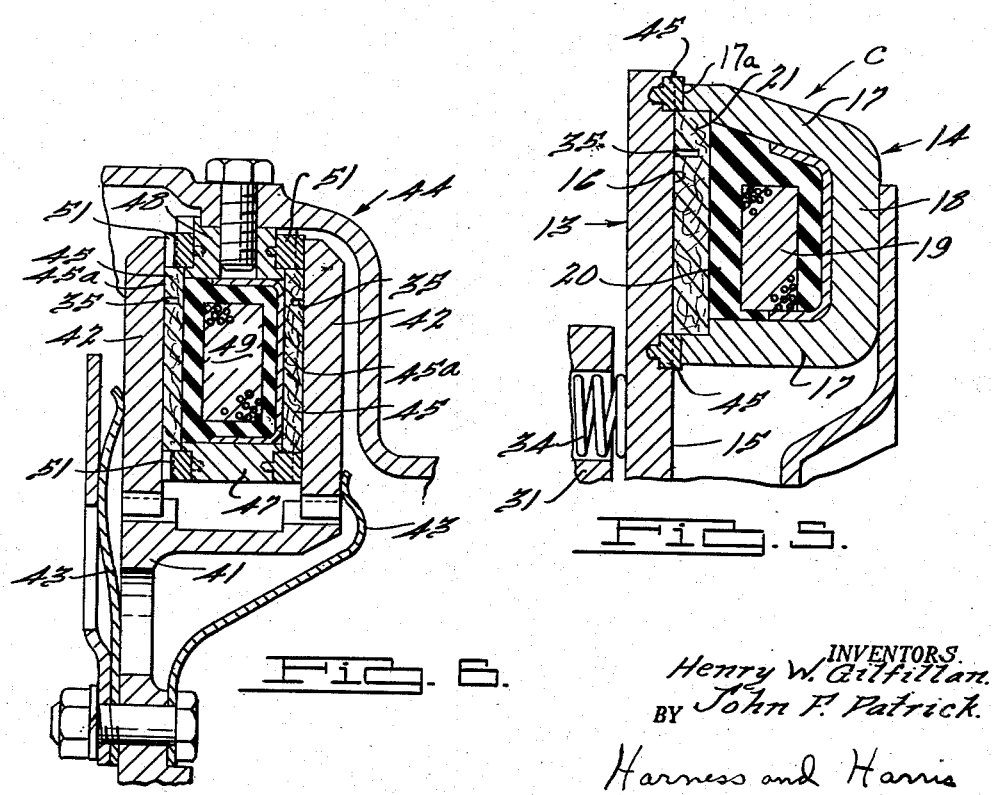
INVENTORS.
Henry W. Gilfillan.
BY John F. Patrick.
Harness and Harris
ATTORNEYS.

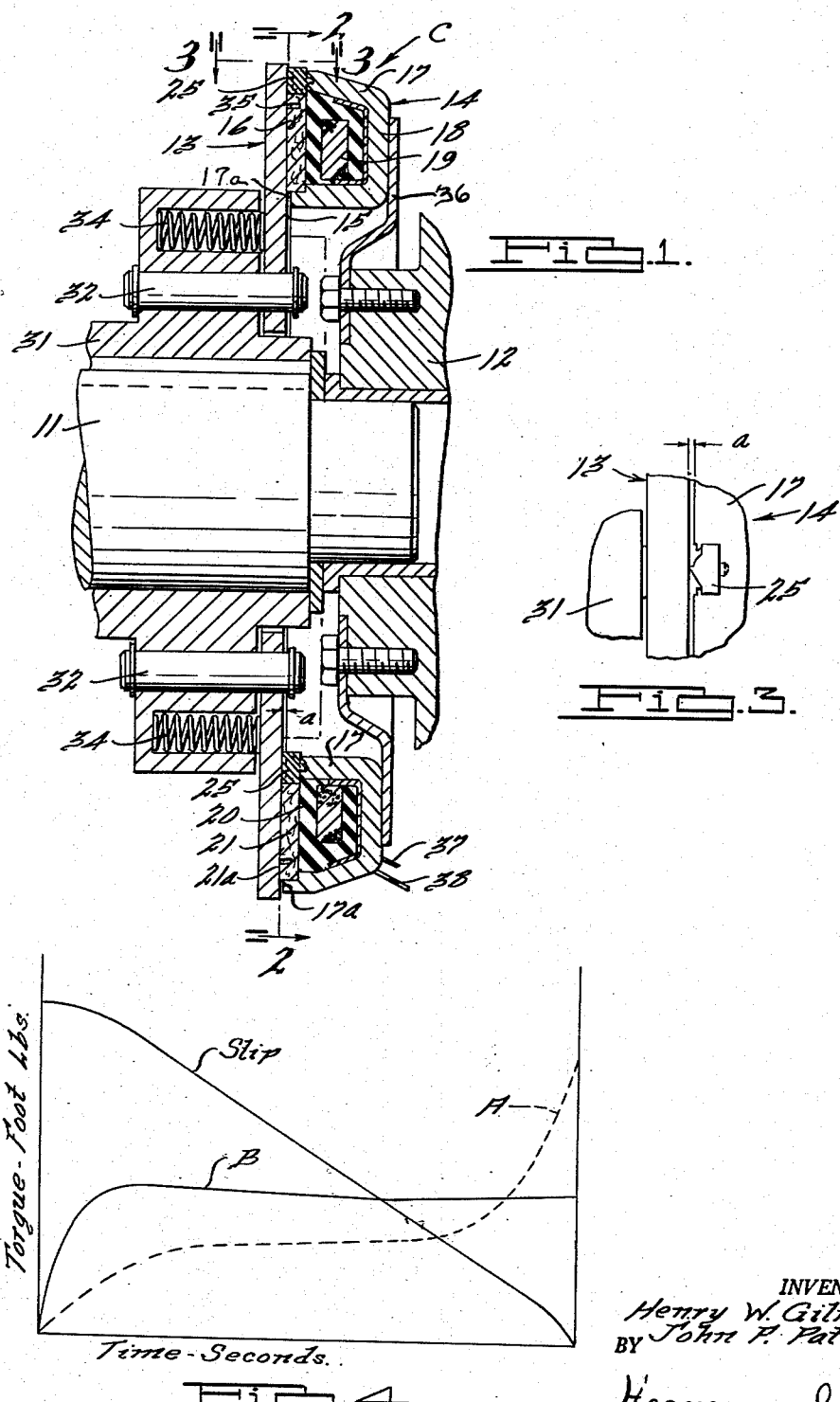

United States Patent Office 2,695,695
Patented Nov. 30, 1954

2,695,695

ELECTROMAGNETICALLY OPERATED CLUTCH OR BRAKE

Henry W. Gilfillan and John F. Patrick, Detroit, Mich., assignors to Chrysler Corporation, Highland Park, Mich., a corporation of Delaware Application May 31, 1950, Serial No. 165,156

2 Claims. (Cl. 192—84)

This invention relates to friction devices having a pair of relatively movable, opposed, frictionally engageable, faces that are adapted to be brought into gripping engagement by electromagnetically operated means.

The primary object of this invention is to provide a clutch or brake device of this type that will efficiently and smoothly transmit torque regardless of the torque load imposed on the device or the degree of excitation of the magnet member of the device due to the maintenance of an air gap between the magnet pole pieces and the associated armature.

It is a further object of this invention to provide a device of this type with means for automatically and continuously maintaining a predetermined air gap between the pole pieces of the magnet member and the opposed, engageable face of the armature member, regardless of the amount of wear of the frictionally engageable contact surfaces of the magnet and armature members.

It is another object of this invention to provide means whereby the pole pieces of the magnet member are prevented from engaging and thus cannot become fused to or arranged so that they may seize the contacting friction surfaces of the associated armature member during excitation of the magnet member.

It is a further object of this invention to provide a friction device of the aforesaid type in which the magnet member is designed in such a way that the magnetizable pole portions thereof are not engageable with the associated armature member but instead a non-magnetizable portion of the magnet having a constant coefficient of friction is positioned so as to engage and transmit torque between the magnet and armature members.

Other objects and advantages of this invention will become apparent from a reading of the following detailed description taken in connection with the accompanying drawings in which:

Fig. 1 is a sectional elevational view of an electromagnetically operated clutch device incorporating one form of this invention;

Fig. 2 is a plan view of the gripping face of the magnet member of the clutch device shown in Fig. 1;

Fig. 3 is a fragmentary, sectional elevational view taken along the line 3—3 of Fig. 1 disclosing the arrangement of a cutter element in the magnet member of the clutch device;

Fig. 4 is a graph disclosing the variations in torque transmission plotted against time for a conventional electromagnetically operated clutch device and a clutch device embodying this invention;

Fig. 5 is a fragmentary sectional elevation of a modified form of clutch construction wherein the cutter elements are mounted on the armature gripping surface; and Fig. 6 is another modified form of this invention wherein the invention has been applied to a double armature, electromagnetically operated, brake mechanism.

Conventional electromagnetically operated friction devices of the type herein disclosed usually have the opposed, frictionally engageable faces of the armature member and magnet member substantially flat so that there will be continuous contact across all portions of the opposed faces when the magnet member is fully excited. In such a conventional electromagnetically operated friction device the exposed ends of the magnetizable pole pieces, as well as the gripping surface of the non-magnetizable friction material of the magnet member, each engage the opposed face of the armature member in surface to surface contact during a large portion of the time the magnet member is excited for torque transmission. At low coil excitation and high slip of the magnet member relative to the armature member the majority of the torque transmitted by such a device is carried by the engagement of the gripping surface of the friction material of the magnet member with the opposed face of the armature member. These engageable surfaces have relatively constant coefficients of friction. As the excitation of the magnet member increases, the slip between the opposed engageable faces of the magnet member and the armature member decreases and it appears that substantially all portions of the exposed ends of the magnet pole pieces as well as the gripping surfaces of the friction material of the magnet bear against the opposed armature surface. As a result of the ends of the pole pieces engaging the armature surfaces there is thought to be a more or less fusing contact between the pole pieces and the armature with a consequent seizure between the magnet member and armature member that results in a sudden reduction in slip and increase in torque transmission between the relatively rotatable members. This sudden seizure produces a jerkiness in clutch or brake operation that may be of little consequence in certain commercial applications of this type of electromagnetically operated friction device, but, creates a condition that is highly undesirable in certain torque transmitting devices such as a variable speed transmission for a motor vehicle or the like. One of the reasons for this seizure between the magnetizable pole pieces of the magnet and the opposed armature appears to be the variation in the coefficient of friction of the pole pieces with variation in the speed of the rotatable member or members.

In an effort to prevent seizure of the opposed gripping surfaces of the magnet and armature members of an electromagnetically operated friction device during variations in torque load and rotative speeds this invention provides means whereby the magnetizable pole pieces of the magnet member will be prevented from contacting the opposed armature face at all times irrespective of the amount of wear of the opposed gripping surfaces of the armature and magnet members. Not only does the means for preventing engagement of the magnetic poles and the armature prevent their actual contact, but, in addition, it maintains a predetermined air gap between the magnet pole pieces and the armature surface so that the torque transmitting characteristics of the electromagnetically operated devices may be substantially constant and positively controlled throughout the life of the device.

In Figs. 1 through 3 of the drawings the invention is shown applied to an electromagnetically operated clutch C that is adapted to transmit torque between the relatively rotatable members 11 and 12. The clutch C in this case comprises the armature member 13 and the magnet member 14. Armature member 13 is a substantially flat-sided, annular plate having a gripping surface 15 that is adapted to be frictionally engaged with the gripping surface 16 of the magnet member 12. Magnet member 14 includes a pair of concentrically arranged, magnetizable, pole pieces 17 connected by a portion 18 so as to provide a shell member of substantially U-shaped cross sectional configuration. Mounted within the space between the pole pieces 17 of the magnet member 14 is an induction coil element 19 that is surrounded by a body of insulating material 20. The insulating material 20 is formed so as to provide a recessed opening between the exposed ends of the pole pieces 17. This opening is adapted to receive the non-magnetizable friction material 21. The exposed surface 21a of the friction material 21 is adapted to engage the gripping surface 15 of the armature member 13. It is preferable that the gripping surface 21a of the friction material 21 extend or project outwardly from the exposed ends of the pole pieces 17 a slight amount, such as 8 to 10 thousandths of an inch so as to insure that the pole pieces 17 will not initially contact the gripping face 15 of the armature member 13. Mounted in the gripping face of the magnet member 14 so as to project outwardly therefrom adjacent the pole pieces 17 are a plurality of cutter elements 25. The cutting edges of the cutters 25 project above the exposed ends 17a of the pole pieces 17 preferably about 3 to 8 thousandths of an inch. It will be seen that the gripping surface 21a of the friction material 21 is slightly above the plane of ends 17a of the pole pieces 17 and also initially above the plane of the cutting edges of the cutters 25. The outward offset of the friction surface 21a and the cutters 25 relative to the pole piece end surfaces 17a is clearly shown in Figs. 1 and 3 where the offset has been designated by the reference letter a.

It will be noted from Figs. 2 and 3 that the cutters 25 are positioned at the inner and outer peripheral edges of the magnet member and anchored in the pole pieces 17. Either one or two cutters may be used along any radially extending section of the magnet 14. Extending radially across the gripping surface 21a of the magnet member 14 adjacent each cutter element 25 is a slot formation 26 that is adapted to provide a channel or duct for dispersing the material that is cut away from the armature surface 15 by the cutter elements 25 when the cutters 25 are pressed into engagement with the gripping surface 15 of the armature member. A circumferentially extending slot 35 may be formed in the surface 21a of the friction material 21 if desired.

The armature member 13 is connected to the hub 31 of the relatively rotatable shaft member 11 by the studs 32. The connection of the armature 13 to the studs 32 is such as to permit limited axial movement of the armature 13 relative to the shaft member 11. Spring means 34 carried by hub 31 bear against the armature 13 so as to lightly press the gripping surface 15 of armature 13 against the gripping surface 21a of the magnet member 14 at all times. Magnet member 14 is connected to the relatively rotatable member 12 by the spider element 36. Conventional slip ring means or the like (not shown) permit the conductors 37 and 38 to conduct current to the coil 19 to effect excitation of the coil member 19 and activation of the magnet member 14. As shown, it will be noted that the rotatable member 12 is piloted on the rotatable member 11 and is fixed against axial movement with respect thereto.

Operation of the clutch device hereabove described is thought to be relatively obvious. The excitation of the coil 19, to effect transmission of torque between the members 11 and 12, causes armature member 13 to be drawn or pressed against the gripping surface 21a of magnet member 14. As the exposed ends 17a of the pole pieces 17 of the magnet member 14 are not in contact with the gripping face 15 of the armature member 13 the torque will always be transmitted between members 13, 14 through the gripping surface 21a of the friction material 21 of the magnet member. As the gripping surface 21a of friction material 21 of magnet 14 bears against and wears the gripping face 15 of armature 13, the cutter elements 25 will engage the opposed portions of the armature surface 15 located opposite the exposed ends 17a of the pole pieces 17 and cut away the contacting portions of the armature surface 15 so as to maintain the predetermined air gap between the exposed ends 17a of the pole pieces 17 and the gripping face 15 of the armature 14. Thus, it is obvious that there is no possibility of the magnet member pole pieces 17 engaging or becoming fixed to the armature member during coil excitation or at any other time and this prevents a possible seizure of these relatively rotatable, engageable members and the consequent jerkiness of operation that might result from such engagement. Also a quieter installation is provided for the metal to metal contact between the pole pieces 17 and the armature face 15 has been eliminated.

The graph in Fig. 4 is thought to rather clearly demonstrate the improvement gained by the application of this invention to a conventional electromagnetically operated friction device wherein the exposed ends of the pole pieces would normally be permitted to contact the gripping surface of the armature member during coil excitation of the magnet member. It will be noted that the curve A is for a conventional electromagnetically operated friction device without cutter elements or the like to maintain an air gap between the armature and magnet pole pieces. Curve A has a very definite sudden increase in torque transmitting properties after a predetermined period of engagement of the armature and magnet members which increase is thought to directly result from the fact that with engagement of and relative rotation between the pole pieces and armature member the engaged metallic surfaces become heated so that their coefficient of friction increases and the surfaces adhere in such a manner that a surface skin welding or seizure occurs between the pole pieces and the armature member. This seizure is very objectionable in any device that requires relatively smooth torque transmission. In distinction, it will be noted that curve B represents the torque transmission of an electromagnetically operated friction device incorporating this invention. In this case the friction device exhibits a substantially constant torque transmitting capacity at all relative rotative speeds of the members and there is no sudden increase in torque capacity that interrupts the smooth transmission of torque between the relatively rotatable members. As all torque is transmitted between the friction material on the magnet member and the armature, which members have a substantially constant coefficient of friction at all relative speeds, this device eliminates the possibility of seizure and the resulting detrimental effects.

Fig. 5 shows a modified form of the invention wherein the cutter elements 45 have been mounted in the gripping surface 15 of the armature member 13 instead of in the exposed ends 17a of the pole pieces 17 of magnet member 14. The operation of the device shown in Fig. 5 is substantially identical to that already described with regard to the Figs. 1 through 3 form of the invention.

In Fig. 6 is shown the application of this invention to an electromagnetically operated brake construction. In this case the relatively movable member 41 mounts a pair of axially shiftable armature members 42. Spring elements 43 normally urge the armature members 42 against the opposed gripping surfaces 45a of the relatively stationary magnet member 44. Magnet member 44 has opposed gripping surfaces 45a of friction material 45 that are similar to the surfaces 21a of the Figs. 1–3 form of the invention. The gripping surfaces 45a are mounted between the concentrically arranged, ring-like, magnetizable pole pieces 47 and 48. The magnet member 44 has a conventional induction coil member 49 mounted between the radially spaced, concentrically arranged pole pieces 47 and 48. On excitation of the coil member 49 the armature members 42 are drawn against the gripping surfaces 45a of the friction material 45. Each of the pole pieces 47 and 48 has mounted in its exposed ends cutter elements 51 which project above the exposed ends of the pole pieces 47 and 48 a sufficient amount to maintain a predetermined air gap between the exposed ends of the pole pieces and the opposed gripping portions of the armature members 42. Obviously the Fig. 6 modification of this invention could have the cutters mounted in the armature members 42 as suggested by the form of the invention shown in Fig. 5.

While cutter elements have been disclosed herein to maintain the predetermined air gap between the magnet member pole pieces and the opposed portions of the armature member, it is not desired to limit this invention to the specific use of cutter elements for it is thought to be obvious that rings or studs of abrasive material, or burnishing tools, or the like, could be substituted for or used in conjunction with the cutter elements to automatically maintain the predetermined air gap between the exposed ends of the magnetizable pole pieces and the adjacent armature surfaces. The armature member of this electromagnetically operated friction device may be formed from any material that will be machinable by the cutter elements 25. Materials such as sintered iron, steel, or cast iron have been found acceptable as armature materials.

We claim:

1. In an electromagnetic friction device comprising a pair of relatively rotatable magnet and armature members arranged to provide a pair of radially extending, opposed, substantially flat, frictionally engageable surfaces, said magnet frictionally engageable surface including a pair of annular, radially spaced apart, magnetizable pole pieces and an area of non-magnetizable, friction material located radially between said pole pieces, the end faces of the pole pieces of said magnet being offset from the surface of the friction material and arranged such that a predetermined air gap will exist between each of said pole piece end faces and said armature when the friction material of said magnet is engaged with the opposed surface of said armature, and cutter means mounted on one of said members and arranged to engage and remove material from only those portions of the other of said members that are located axially opposite the magnet pole piece end faces to thereby maintain the said air gaps regardless of wear of the opposed engageable surfaces of said members.

2. In an electromagnetic friction device, relatively rotatable armature and magnet members adapted for relative axial movement into and out of frictional gripping engagement, said armature including a flat, annular armature surface, said magnet comprising inner and outer concentrically arranged annular magnetic pole pieces providing axially facing, radially spaced apart, end surfaces with non-magnetic friction material supported on said magnet between said pole pieces having a gripping face engageable with said armature surface disposed above the plane of the end surfaces of said pole pieces so as to be spaced axially outwardly therefrom a predetermined amount, and material removing means mounted on said magnet pole pieces and projecting outwardly therefrom several thousandths of an inch adapted to engage and remove those portions of the armature face axially aligned with the end surfaces of said pole pieces to maintain a predetermined air gap between the pole pieces and the armature.

References Cited in the file of this patent

UNITED STATES PATENTS

| Number | Name | Date |
|---|---|---|
| 882,607 | Anderson | Mar. 24, 1908 |
| 903,945 | Ast | Nov. 17, 1908 |
| 1,024,737 | Miller | Apr. 30, 1912 |
| 1,049,957 | Whitcomb | Jan. 7, 1913 |
| 1,056,243 | Whitcomb | Mar. 18, 1913 |
| 1,880,061 | Warner | Sept. 27, 1932 |
| 1,981,208 | Warner | Nov. 20, 1934 |
| 2,421,757 | Oetzel | June 10, 1947 |
| 2,492,205 | Warner | Dec. 27, 1949 |

FOREIGN PATENTS

| Number | Country | Date |
|---|---|---|
| 556,182 | Great Britain | Sept. 23, 1943 |